United States Patent [19]  
Picard et al.

[11] Patent Number: 4,559,993  
[45] Date of Patent: Dec. 24, 1985

[54] PROCESS FOR STABILIZING A MIXTURE OF MOLTEN ALKALI METAL NITRATES AND ALKALI METAL NITRITES USABLE PARTICULARLY AS A HEAT TRANSFER FLUID AND STABILIZED MIXTURE THUS OBTAINED

[75] Inventors: Gérard Picard, Charenton le Pont; Thierry Flament, Boulogne Billancourt; Bernard Tremillon, Bure sur Yvette; Pierre Saint-Paul, Samois; Pierre Spiteri, Avon, all of France

[73] Assignee: Electricite de France, Paris, France

[21] Appl. No.: 536,119

[22] Filed: Sep. 26, 1983

[30] Foreign Application Priority Data

Sep. 27, 1982 [FR] France .................. 82 16201

[51] Int. Cl.[4] .................................................. C01F 11/36
[52] U.S. Cl. .......................................... 165/1; 252/70; 252/71; 423/265; 423/385; 423/395
[58] Field of Search ............... 423/184, 194, 198, 395, 423/265, 385; 252/70, 71; 165/1

[56] References Cited

U.S. PATENT DOCUMENTS 2,375,759 5/1945 Kalichevsky et al. ............ 252/71
2,375,760 5/1945 Fahnestock .......................... 252/71
2,375,761 5/1945 Bates ................................... 252/71

FOREIGN PATENT DOCUMENTS 190875 1/1967 U.S.S.R. .

Primary Examiner—John Doll  
Assistant Examiner—Wayne A. Langel  
Attorney, Agent, or Firm—Pollock, Vande Sande & Priddy

[57] ABSTRACT

The present invention relates to a process for stabilizing a mixture of molten alkali metal nitrates and alkali metal nitrites usable particularly as a heat transfer fluid and to the stabilized mixture thus obtained.

The process comprises adding to the mixture a quantity of alkali metal hydroxide such that the value of the logarithm of the ratio $P(H_2O)/|OH^-|^2$ (where $P(H_2O)$ denotes the partial pressure of water vapor expressed in atmospheres and $|OH^-|$ the hydroxide ion concentration expressed in moles/kg) is between a value b corresponding to the disproportionation of the nitrites into nitrate and nitric oxide and a value a corresponding to the appearance of peroxides, the values a and b being determined for a given nitrate/nitrite ratio, a given temperature and given partial pressures of the gases blanketing the mixture.

7 Claims, 6 Drawing Figures

FIG_4

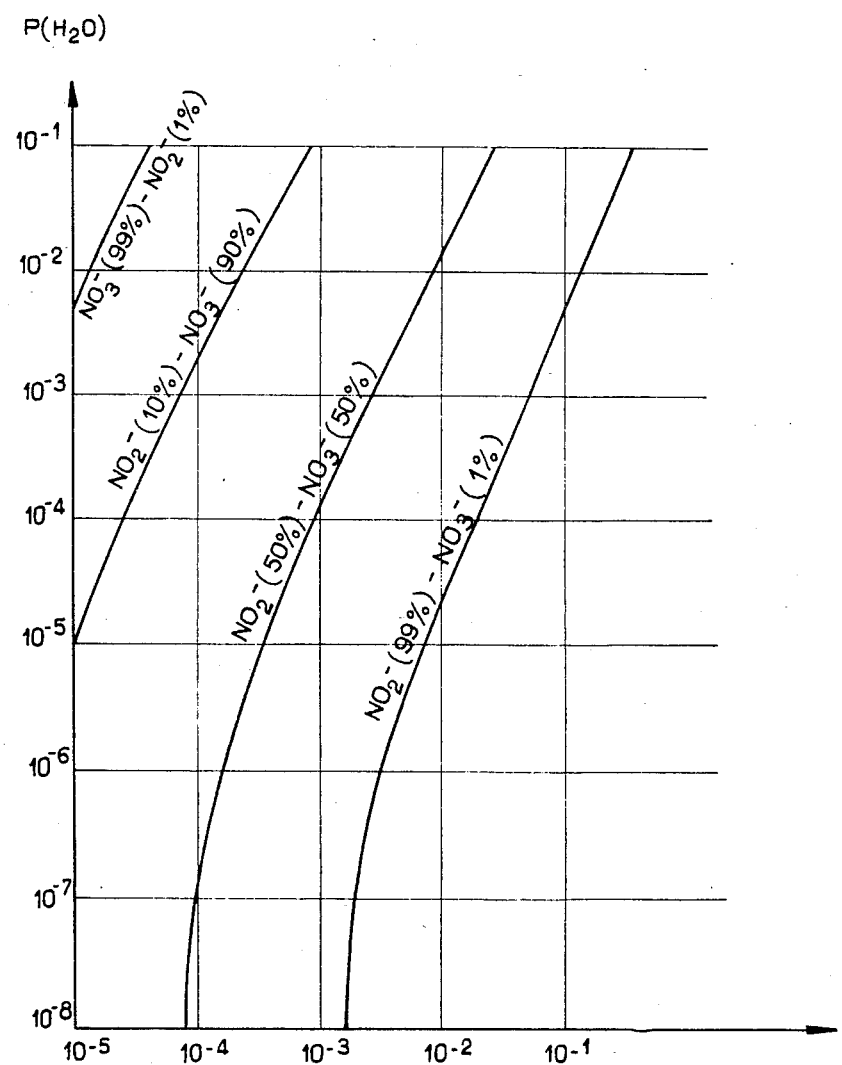
FIG_6

PROCESS FOR STABILIZING A MIXTURE OF MOLTEN ALKALI METAL NITRATES AND ALKALI METAL NITRITES USABLE PARTICULARLY AS A HEAT TRANSFER FLUID AND STABILIZED MIXTURE THUS OBTAINED

FIELD OF THE INVENTION

The present invention relates to a process for stabilizing a mixture of molten alkali metal nitrates and alkali metal nitrites usable particularly as a heat transfer fluid and to the stabilized mixture thus obtained.

PRIOR ART

The mixtures of molten alkali metal nitrates and alkali metal nitrites are currently employed in industry as heat transfer fluids because of their high heat capacity and their low melting point. Such mixtures have advantageously replaced organic liquids by virtue of their lower cost and their ability to operate at much higher temperatures.

These heat transfer fluids find application in various industrial areas, particularly in the oil industry and in solar electric power stations.

The mixture of alkali metal nitrates and alkali metal nitrites which is used most generally is the eutectic mixture whose composition by weight is as follows: 53% $KNO_3$, 40% $NaNO_2$ and 7% $NaNO_3$. This eutectic mixture melts at 140° C. and has a high specific heat (Cp=1.56 kJ/kg.K).

This eutectic mixture is at present employed in the temperature range between 140° C. (melting point) and approximately 450° C. Above 350° C. the salt must be protected with a blanket of inert gas, which is usually nitrogen, to prevent the oxidation of the nitrites by atmospheric oxygen. In the region of 450° C., more or less rapid disappearance of the nitrites is observed, with a corresponding increase in the melting point of the salt. This phenomenon, which is highly accelerated by the temperature increase, restricts the use of the mixture to temperatures below 500° C. and obliges the user to regenerate the salt periodically.

The main object of the invention is to improve the stability of the mixtures of molten alkali metal nitrates and alkali metal nitrites so that these mixtures can reach temperatures of the order of 500° C. without deterioration of their composition.

Another object of the invention is to develop stabilized mixtures capable of being employed as a heat transfer fluid in a solar electric power station in which the fluid circulates in a thermal loop whose limiting operating temperatures are respectively 250° and 500° C.

It has been found quite unexpectedly that the stability of a mixture of molten alkali metal nitrates and alkali metal nitrites, capable of being used as a heat transfer fluid, could be improved by adding to the mixture a quantity of alkali metal hydroxide which can be precisely determined for a given nitrate/nitrite ratio and a given temperature.

More precisely, the quantity of alkali metal hydroxide must be such that the value of the logarithm of the ratio $P(H_2O)/|OH^-|^2$ (where $P(H_2O)$ denotes the partial pressure of water vapor expressed in atmospheres and $|OH^-|$ the hydroxide ion concentration expressed in moles/kg) is between a value b corresponding to the disproportionation of the nitrites into nitrate and nitric oxide and a value a corresponding to the appearance of peroxides, the values a and b being determined for a given nitrate/nitrite ratio, a given temperature and given partial pressures of the gases blanketing the mixture.

According to another characteristic of the invention the values a and b are determined from diagrams of electrochemical potential and oxoacidity, where the oxoacidity is expressed by the value $PO^{2-} = -\log a(O^{2-}) = pK(H_2O/OH^-) + \log \{P(H_2O)/|OH^-|^2\}$ (where $a(O^{2-})$ denotes the activity of the oxide ion and $K(H_2O/OH^-)$ the oxoacidity constant of the pair $H_2O/OH^-$).

According to yet another characteristic of the invention, the area of stability of the mixture for a given nitrate/nitrite ratio is determined graphically by plotting on a diagram the variations of the values a and b as a function of temperature.

Thus, in the case where the mixture is intended to be employed as a heat transfer fluid operating at a maximum temperature or "high temperature", as in the case of a heat transfer fluid employed in the cracking industry, a series of suitable mixtures having various nitrate/nitrite ratios and various added amounts of alkali metal hydroxide will be determined, for a specified partial pressure of water vapor.

In the case where the mixture is intended to be employed as a heat transfer fluid operating between a minimum temperature or "low temperature" and a maximum temperature or "high temperature", as is the case for example in a solar electric power station, the nitrate/nitrite ratio will first be determined so that the melting point of the mixture is below the low temperature and then the quantity of alkali metal hydroxide which is to be added to the mixture for the mixture thus obtained to be stable at the high temperature is determined, for a specified value of the partial pressure of water vapor.

DESCRIPTION OF THE DRAWINGS

Other characteristics and advantages of the invention will be better understood from the reading of the detailed description which follows and which refers to the attached drawings in which:

FIG. 6 shows the minimum total oxide contents stabilizing various mixtures of nitrates and nitrites at a given temperature, namely 470° C.

The decomposition reactions of mixtures of alkali nitrates and alkali metal nitrites have already been studied in the past, but the authors do not agree on the reactions which take place in these media. It appears nevertheless that these reactions are accompanied by evolution of nitrogen, nitrogen oxides (NO, $N_2O$, $NO_2$) and oxygen, with formation of alkali metal oxides. The complexity of these reactions led to a preliminary study by the Applicant of the reactions likely to take place in the mixtures of nitrate and nitrite.

Since these reactions involve various degrees of oxidation of nitrogen, as well as the oxide ion, the results obtained have been presented in the form of a potential-oxoacidity diagram (the oxoacidity being expressed by the value $pO^{2-}$ which represents the cologarithm of the activity of the oxide ion). The concept of oxoacidity has been proposed to give a definition of acidity in molten salts, analogous to that of Bronsted in aqueous solution, based on the exchange of the oxide ion ($O^{2-}$). The "acid/base" pairs being the acceptor-donor pairs for this ion, the oxide ion acceptors are called oxoacids and the oxide ion donors are called oxobases. The oxoacid/oxobase pairs are defined by the equilibrium:

$$\text{oxobase} \rightleftharpoons \text{oxoacid} + O^{2-}$$
(donor)        (acceptor)

which is characterized by the constant:

$$K = \frac{a(\text{oxoacid})\, a(O^{2-})}{a(\text{oxobase})}$$

The oxoacidity is then measured by means of the value of $pO^{2-}$ defined as:

$$pO^{2-} = -\log a(O^{2-})$$

$a(O^{2-})$ denoting the activity of the oxide ions in the medium.

The various thermochemical data employed within the scope of this study involve the concept of activity of the substances. For each of these it is necessary to define a standard state in which the activity of the substance equals 1. The standard states which have been chosen are the pure substance for the solid or liquid compounds and the gas at a pressure of one atmosphere for the gaseous compounds. Within the scope of this study, where the pressures remain low (below one atmosphere) and the temperatures high, the activity of a gas can be approximated to the partial pressure of this gas.

Similarly, the activities of the nitrates and the nitrites can be taken as approximately equal to their respective molar fractions.

Figure 1:
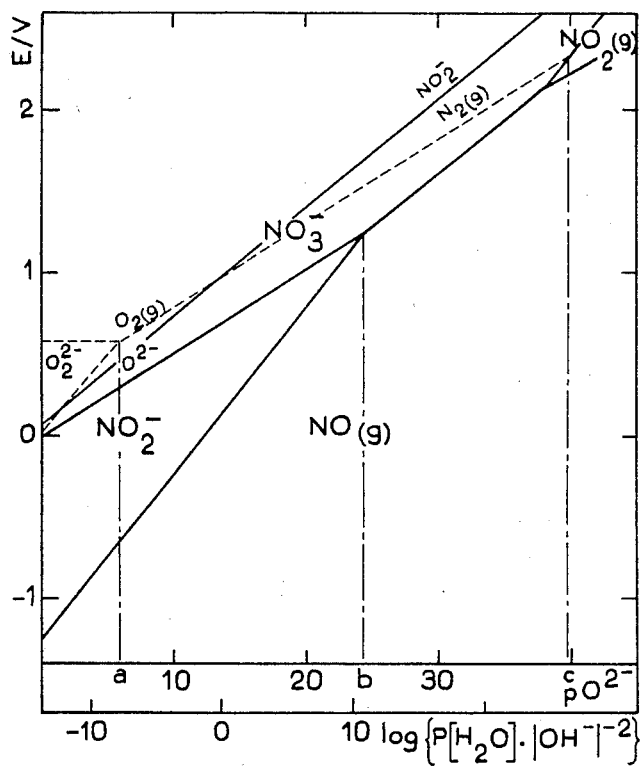
FIGS. 1 and 2 show two potential—oxoacidity diagrams determined for the same mixture of nitrates and nitrites at two different temperatures (227° C. and 527° C.)
Figure 2:
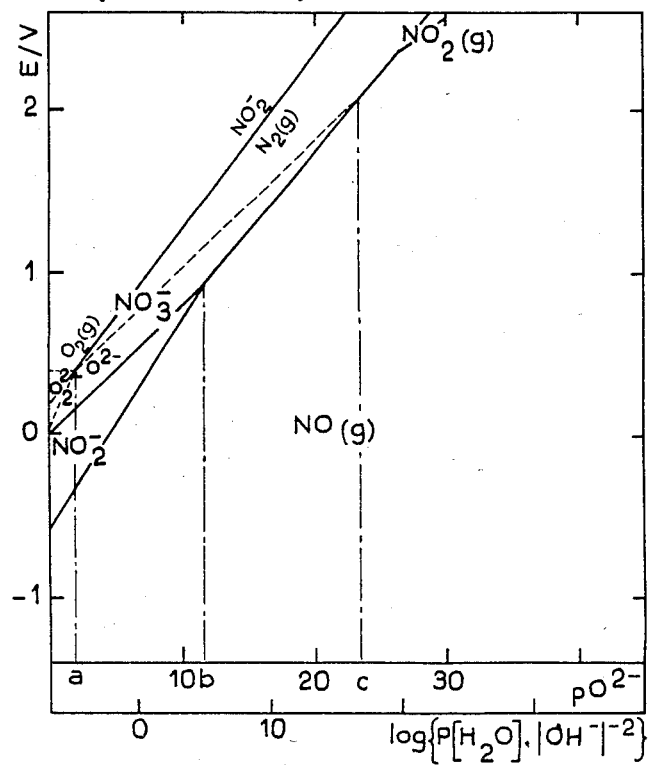

The study of the potential—oxoacidity diagrams, such as those shown in FIGS. 1 and 2, is found to be essential for determining the area of stability of the mixtures of alkali metal nitrates and alkali metal nitrites.

The potential—oxoacidity diagrams have been determined from thermochemical data in the following manner.

First of all, scales of oxoacidity in the nitrate-nitrite mixtures were determined at various temperatures, since very few experimental data were available. An electrode with an yttriated zirconium oxide membrane was used to measure the activity of the oxide ion. It enabled oxoacid-base titrations to be carried out, which led to the determination of the oxoacidity constants for the pairs $Cr_2O_7^{2-}/CrO_4^{2-}$, $CO_2/CO_3^{2-}$ and $H_2O/OH^-$. The following formulae take account of the variations of the various pK as a function of the temperature in the range in question ($420° < T < 520°$ C.) (molality scale):

$$pK(H_2O/OH^-) = -4.8 + \frac{5.48 \cdot 10^3}{T}$$

$$pK(CO_2/CO_3^{2-}) = -9.7 + \frac{1.26 \cdot 10^4}{T}$$

$$pK(Cr_2O_7^{2-}/CrO_4^{2-}) = -12.8 + \frac{1.8 \cdot 10^4}{T}$$

By means of these buffers it is possible hereafter to establish the potential-$pO^{2-}$ diagrams of the nitrate-nitrite mixtures. These mixtures consist in fact of the two components of an oxidizer-reducer pair ($NO_3^-/NO_2^-$); the potential of the medium therefore depends only on the activity of the oxide ion, and its variation, measured by means of a platinum electrode, follows the NERNST relationship.

$$E = E°(NO_3^-/NO_2^-) + \frac{2.3\,RT}{2F} \log \frac{a(NO_3^-)}{a(NO_2^-)} + \frac{2.3\,RT}{2F} pO^{2-}$$

Thus, the straightforward measurement of the potential difference between a platinum wire immersed in the molten salt and a reference electrode (Ag/Ag$^I$ (0.057 mol.kg$^{-1}$) in (Na—K)NO$_3$) has made it possible, by varying the oxoacidity, to determine the value of the normal potential of the nitrate/nitrite pair. Furthermore, by bubbling nitric oxide through the mixtures of a given composition, the potential and the oxoacidity of the medium are assigned to the values corresponding to the triple point of the mixture in question. The normal potentials of the pairs $NO_3^-/NO$ and $NO_2^-/NO$ can then be determined by extrapolation to zero $pO^{2-}$ using the NERNST relationships relative to these two redox pairs. The variations of the normal potential differences with the temperature ($420° < T < 520°$ C.) are given by the expressions:

$$E°(NO_3^-/NO_2^-) = -1.18 + 5.10^{-4}T\ (T/°C.)$$

$$E°(NO_3^-/NO) = 1.50 + 9.10^{-4}T\ (T/°C.)$$

$$E°(NO_2^-/NO) = -2.21 + 1.8.10^{-3}T\ (T/°C.)$$

The diagrams thus obtained are similar to those shown in FIGS. 1 and 2 and show that it is possible to consider four areas of acidity bounded by the values a, b and c of the cologarithm of the activity of the oxide ion.

For values which are smaller than a, the peroxide ions are stable, which results in a narrowing of the area of existence of the nitrate ions to the strongly basic media, by displacement of the equilibrium:

$$NO_3^- + O^{2-} \rightleftharpoons NO_2^- + O_2^{2-}$$

toward the formation of nitrite and peroxide, an effect which is harmful to the preservation of the composition of a given nitrate-nitrite mixture.

While a strong basicity of the medium favors the stability of the nitrites, in contrast, an oxoacidity such that the value of the $pO^{2-}$ exceeds the value b leads to the disproportionation of the nitrites according to:

$$3NO_2^- \rightleftharpoons 2NO_{(g)} + O^{2-} + NO_3^-$$

(the sign g denotes that the compound is gaseous).

A fairly small reduction in the stability of the nitrates is moreover observed until the $pO^{2-}$ reaches the value c, after which there is observed the gradual disappearance of the nitrate ion. At a low temperature (T<490° C.) this disappearance takes place following the reaction:

$$2NO_3^- \rightarrow 2NO_{2(g)} + \tfrac{1}{2}O_{2(g)} + O^{2-}$$

while at a higher temperature it is the equilibrium:

$$2NO_3^- \rightleftharpoons 2NO_{(g)} + 3/2 O_{2(g)} + O^{2-}$$

which takes place because of the dissociation of the nitrogen dioxide into nitric oxide and oxygen, which commences at 490° C.

These potential-$pO^{2-}$ diagrams show that a nitrate-/nitrite mixture, of a given composition, is stable when the value of the $pO^{2-}$ is between a and b.

It appears therefore that the values a and b defined earlier are of prime importance for the stability of the mixtures of nitrates and nitrites. Since the values a and b vary with temperature, it is preferable, to compare the diagrams obtained at different temperatures, to consider another function related to the $pO^{2-}$, but involving only the values which are obtainable directly experimentally, this function having the form $\{P(H_2O)/|OH^-|^2\}$. In fact, the hydroxide ion, which is an oxo-base, is capable of dissociating according to:

$$2OH^- \rightleftharpoons H_2O_{(g)} + O^{2-}$$

The various activities and partial pressures are connected by the law of mass action:

$$K(H_2O/OH^-) = \frac{P(H_2O) \cdot a(O^{2-})}{a(OH^-)^2}$$

which leads to the relationship:

$$pO^{2-} = pK(H_2O/OH^-) + \log \frac{P(H_2O)}{a(OH^-)^2}$$

The value of the $pO^{2-}$ is thus connected to two quantities which can be varied, namely the partial pressure of water vapor and the concentration of hydroxide.

The values of the oxoacidity constant $K(H_2O/OH^-)$ calculated from the thermochemical data are collated in Table I.

TABLE I

| Concentration scales | Temperatures | |
|---|---|---|
| | T = 227° C. | T = 527° C. |
| Concentrations expressed in molar fractions | $10^{-13.5}$ atm | $10^{-6.6}$ atm |
| Concentrations expressed in mol·kg$^{-1}$ | $10^{-14.6}$ atm/mol·kg$^{-1}$ | $10^{-7.7}$ atm/mol·kg$^{-1}$ |

It is thus possible to compare the variation of the three characteristic values a, b and c with the temperature, their positions also varying with the composition of the nitrate/nitrite mixture in question. Their variations with the temperature, for various mixtures, are plotted in FIG. 3. It appears therefore that, in accordance with the present invention, a mixture is stable at a given temperature if the value of the logarithm of the ratio $P(H_2O)/OH^{-2}$ is between the value b which represents the disproportionation of the nitrites into nitrate and nitric oxide and the value a corresponding to the appearance of the peroxides.

Figure 3:
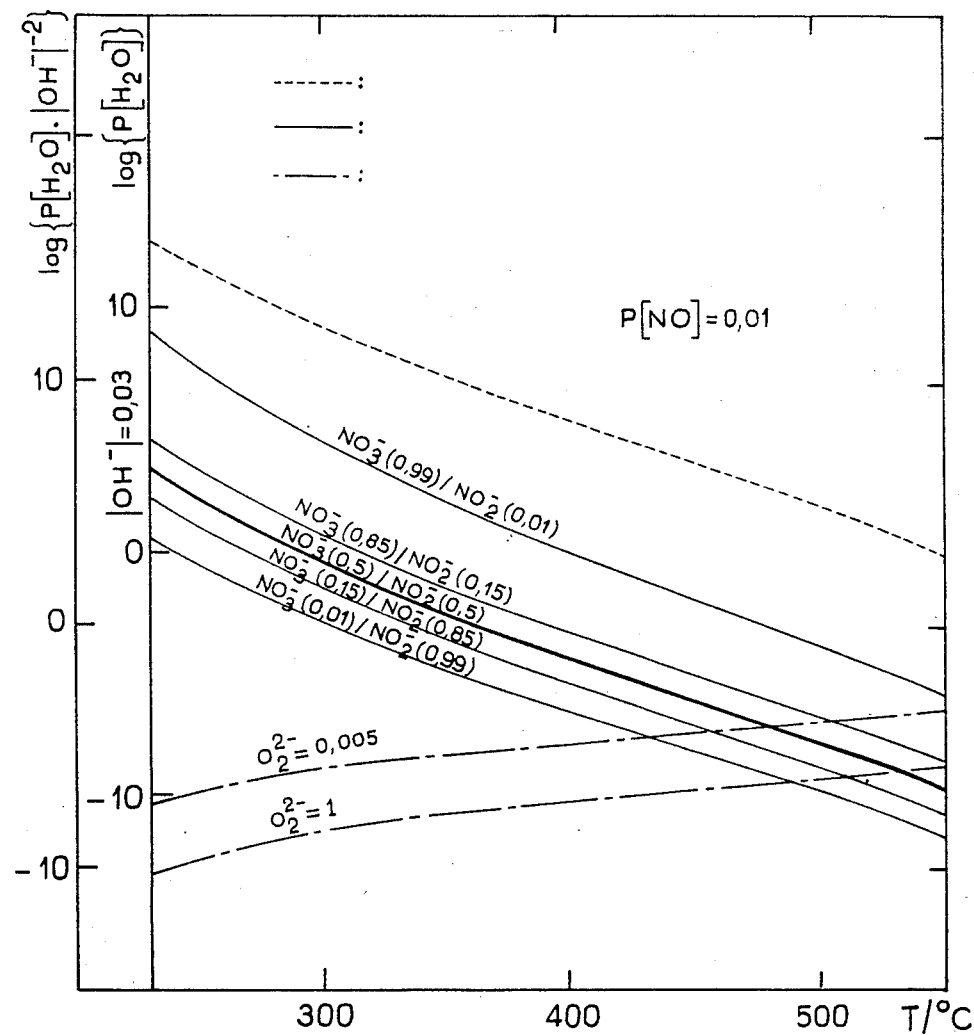
FIG. 3 is a diagram showing particularly the variation of the points a and b with the temperature for various mixtures of nitrates and nitrites.

For example, FIG. 3 shows that, in theory, an equimolar nitrate-nitrite mixture whose composition is substantially close to that of the eutectic mixture referred to above, is stable only up to 500° C. and only if the logarithm of the ratio $P(H_2O)/OH^{-2}$ has the value of $-5$. If the temperature rises above this limit, the mixture becomes progressively richer in nitrate. As a result, the joint use of FIG. 3 and of the potential-$pO^{2-}$ diagrams makes it possible to fix the limits of acidity and of temperature beyond which the equimolar nitrate-nitrite mixture decomposes rapidly.

It will be noted in this connection that FIGS. 1 and 2 represent only non-limiting examples of diagrams produced for an equimolar mixture and that other diagrams can naturally be produced in a similar manner for mixtures of various compositions.

It appears, consequently, that the main parameters influencing the stability of the nitrate-nitrite mixtures are the $pO^{2-}$, the composition of the mixture and the temperature. The influence of the gas blanket must also be noted, this being a fact which is already known per se. It is known, in fact, that oxygen plays a very important role in the stability of the nitrate-nitrite mixtures, since a partial pressure of this gas as low as $10^{-3}$ atmospheres results in a complete conversion of nitrites to nitrates. It is furthermore known that it is preferable to operate under nitrogen.

From the experimental results it is possible to determine graphically the area of stability of a nitrate-nitrite mixture for a given nitrate/nitrite ratio by plotting on a diagram the variations of the values a and b as a function of the temperature.

Figure 4:
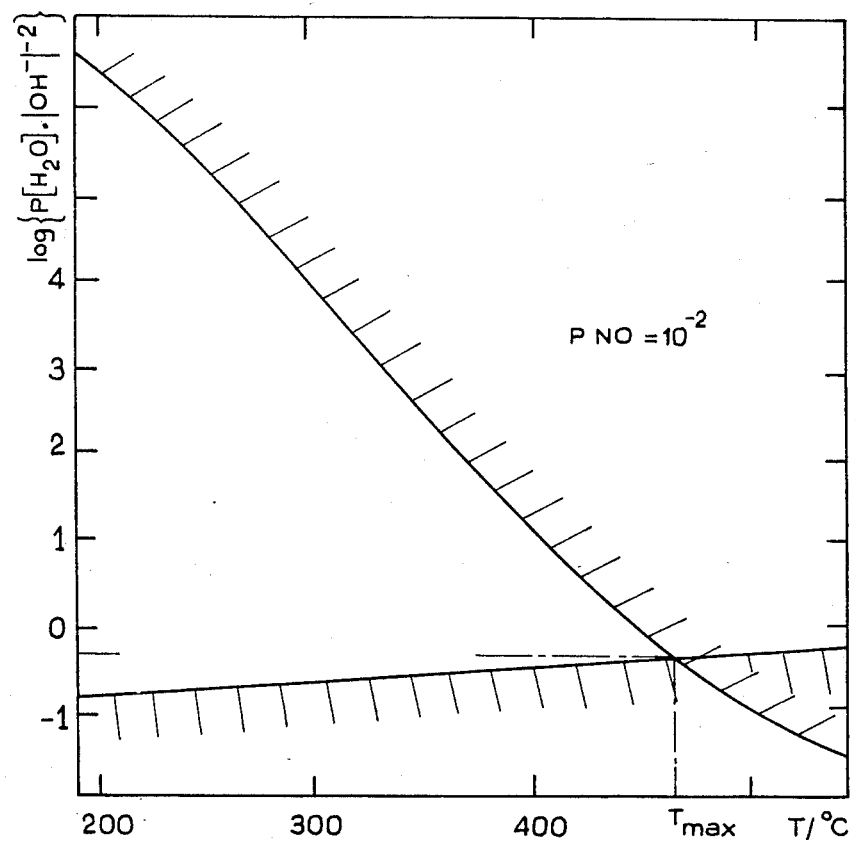
FIG. 4 is a diagram showing the area of stability of the equimolar mixture of nitrates and nitrites.

FIG. 4 shows, by way of example, such a diagram established from experimental data in the case of an equimolar nitrate-nitrite mixture. The range of stability of this mixture corresponds to the area comprised between the two curves representing the two decomposition reactions, namely the disproportionation reaction of nitrites and the formation reaction of peroxides. In addition, the diagram makes it possible to fix a temperature limit corresponding to the intersection of these two curves. Thus, in the present case, the maximum temperature of use is 480° C., in the most unfavorable conditions which have been considered for the activities and the partial pressures of the compounds in question.

Furthermore, in order that this maximum temperature can be attained, the value of the logarithm of $P(H_2O)/|OH^-|^2$ must be fixed at the value corresponding to the intersection of the two curves, namely $-0.3$. This value corresponds, for example, to a partial pressure of water vapor of $3 \times 10^{-2}$ atmospheres for a concentration of alkali metal hydroxide of 1% by weight.

The use of the potential-$pO^{2-}$ diagrams which are obtained at various temperatures makes it possible to determine the conditions resulting in a higher stability of the nitrate-nitrite mixtures. The temperature plays a most important role since for values above 480° C. (in the case of the equimolar mixture and under the conditions indicated earlier), it is no longer possible to avoid the decomposition. As a result, any excessive overheating of the heat transfer fluid must be avoided wherever possible.

The values of limiting oxoacidity and of pK of water for various temperatures are shown in Table II below.

TABLE II

LIMITING OXOACIDITY AND pK OF WATER AS A FUNCTION OF TEMPERATURE (CONCENTRATIONS IN MOLE/KG).

| Temperature (°C.) | Limiting oxoacidity | pK of water | Note |
|---|---|---|---|
| 420 | 5.7 | 3.1 | Experimental |
| 470 | 4.1 | 2.6 | values |
| 520 | 2.7 | 2.1 | |
| 550 | 1.9 | 1.9 | Extrapolated |
| 575 | $1.3_5$ | $1.6_5$ | values |
| 600 | 0.8 | 1.5 | (1/T °K. law) |

Figure 5:
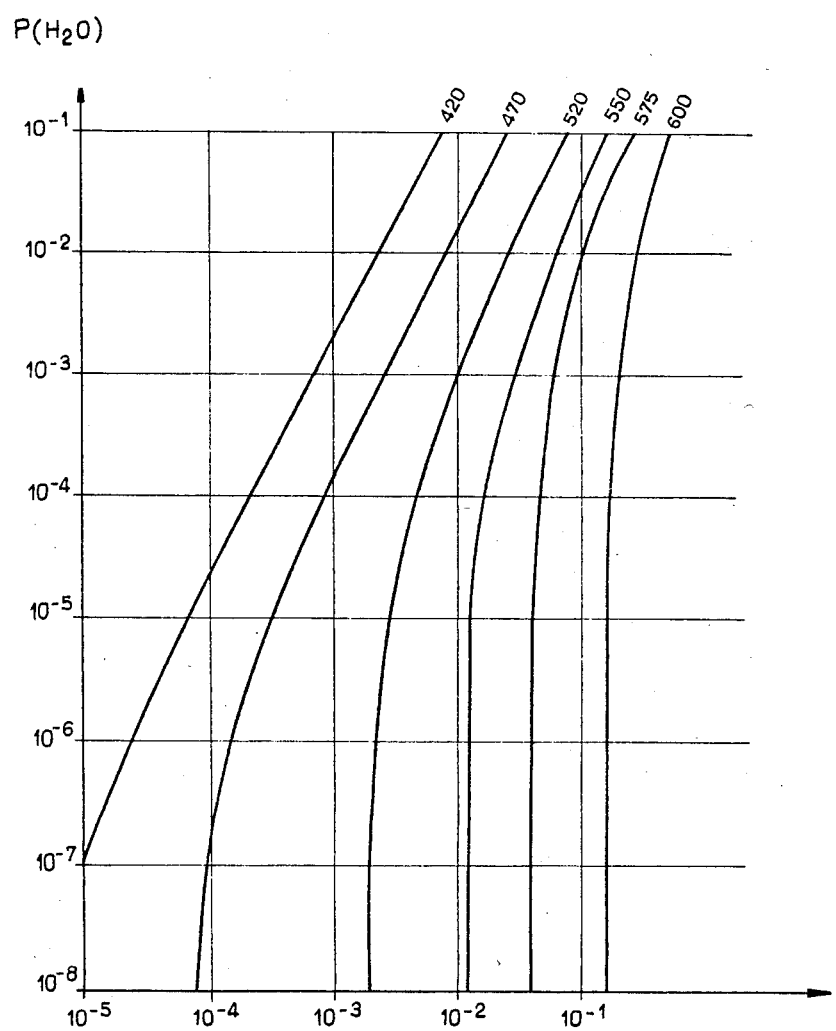
FIG. 5 shows the minimum total oxide contents stabilizing a mixture of nitrates and nitrites for various temperatures and partial pressures of water vapor.

The curves shown in FIG. 5 make it possible to determine the minimum total oxide concentrations stabilizing an equimolar nitrate-nitrite mixture for various temperatures and partial pressures of water vapor. In addition, the curves in FIG. 6 illustrate the variations in the minimum total oxide concentrations stabilizing various nitrate-nitrite mixtures at a temperature of 470° C. and for various partial pressures of water vapor.

The stabilized mixture of the invention can be employed as a heat transfer fluid particularly in cracking plants or in solar electric power stations.

In the first case, the heat transfer fluid is intended to operate at a maximum temperature, or high temperature. In such plants, where the partial pressure of water vapor is usually specified, it will be possible, according to the invention, to define a series of suitable mixtures having various nitrate/nitrite ratios and various quantities of added alkali metal hydroxide.

In the second case, where the mixture is intended to be employed as a heat transfer fluid operating between a minimum temperature, or low temperature, and a maximum temperature, or high temperature, the appropriate nitrate/nitrite ratio will first be determined so that the melting point of the mixture is below the low temperature in question. The quantity of alkali metal hydroxide to be added to the mixture in order that the latter should be stable at the high temperature in question can then be determined, for a specified value of the partial pressure of water vapor. As shown earlier, by way of example, the addition of alkali metal hydroxide to an equimolar mixture of nitrate and nitrite makes it possible to reach a maximum temperature of use of at least 480° C. (FIG. 5 shows, in fact, that it is possible to avoid the decomposition of an equimolar nitrate-nitrite mixture, through a disproportionation of the nitrites, up to temperatures of the order of 600° C.) provided, of course, that the value of the partial pressure of water vapor and of the hydroxide ion concentration are interrelated by the relationship already shown.

The alkali metal hydroxide employed in the case of the present invention can be sodium hydroxide, potassium hydroxide or equally a mixture of these two products. The process of the invention can also be carried out with lithium oxide, as well as with its mixtures with other alkali metal hydroxides or alkaline earth metal hydroxides. The stabilized mixture of the invention is not restricted to use as a heat transfer fluid in an oil plant or in a solar electric power station, but can naturally be applied in other areas, for example as a bath for treating materials.

What is claimed is:

1. A process of transferring heat from a first zone to a second zone by a heat transfer fluid wherein said heat transfer fluid is a mixture of molten alkali metal nitrates and alkali metal nitrites comprising the steps of adding an alkali metal hydroxide to a mixture of alkali metal nitrates and alkali metal nitrites, the quantity of alkali metal hydroxide added being such that the value of the logarithm of the ratio $P(H_2O)/|OH^-|^2$, where $P(H_2O)$ denotes the partial pressure of water vapor expressed in atmospheres and $|OH^-|$ the hydroxide ion concentration expressed in moles/kg, is between a value b corresponding to the disproportionation of the nitrites into nitrate and nitric oxide and a value a corresponding to the appearance of peroxides, the values a and b being determined for a given nitrate/nitrite ratio, a given temperature, and given partial pressures of the gases blanketing the mixture, heating the resulting mixture of alkali metal nitrates, alkali metal nitrites and alkali metal hydroxides in said first zone, said mixture being in a molten state, transferring the resulting heated molten mixture into said second zone, and removing heat from the heated mixture in said second zone.

2. The process as claimed in claim 1, wherein the values a and b are determined from diagrams of electrochemical potential and oxoacidity where the oxoacidity is expressed by the value $pO^{2-} = -\log a(O^{2-}) = pK(H_2O/OH^-) + \log \{P(H_2O)/|OH^-|^2\}$ where $a(O^{2-})$ denotes the activity of the oxide ion and $K(H_2O/OH^-)$ the oxoacidity constant of the pair $H_2O/OH^-$.

3. The process as claimed in claim 2, wherein the area of stability of the mixture for a given nitrate/nitrite ratio is determined graphically by plotting on a diagram the variations of the values a and b as a function of temperature.

4. The process as claimed in claim 3, wherein the intersection of the two curves expressing respectively the variations of the values a and b gives the maximum temperature of stability of the mixture.

5. The process as claimed in claim 1, in which the mixture is intended to be employed as a heat transfer fluid operating at a maximum temperature or "high temperature", wherein a series of suitable mixtures having various nitrate/nitrite ratios and various added quantities of alkali metal hydroxide is determined, for a specified partial pressure of water vapor.

6. The process as claimed in claim 1, in which the mixture is intended to be employed as a heat transfer fluid operating between a minimum temperature or "low temperature", and a maximum temperature or "high temperature", wherein the nitrate/nitrite ratio is determined so that the melting point of the mixture is below the low temperature and then the quantity of alkali metal hydroxide which is to be added to the mixture for the mixture thus obtained to be stable at the high temperature is determined for a specified value of the partial pressure of water vapor.

7. The process as claimed in claim 1, wherein the alkali metal hydroxide added is sodium hydroxide, potassium hydroxide, or a mixture thereof.

* * * * *